United States Patent Office 3,175,345
Patented Mar. 30, 1965

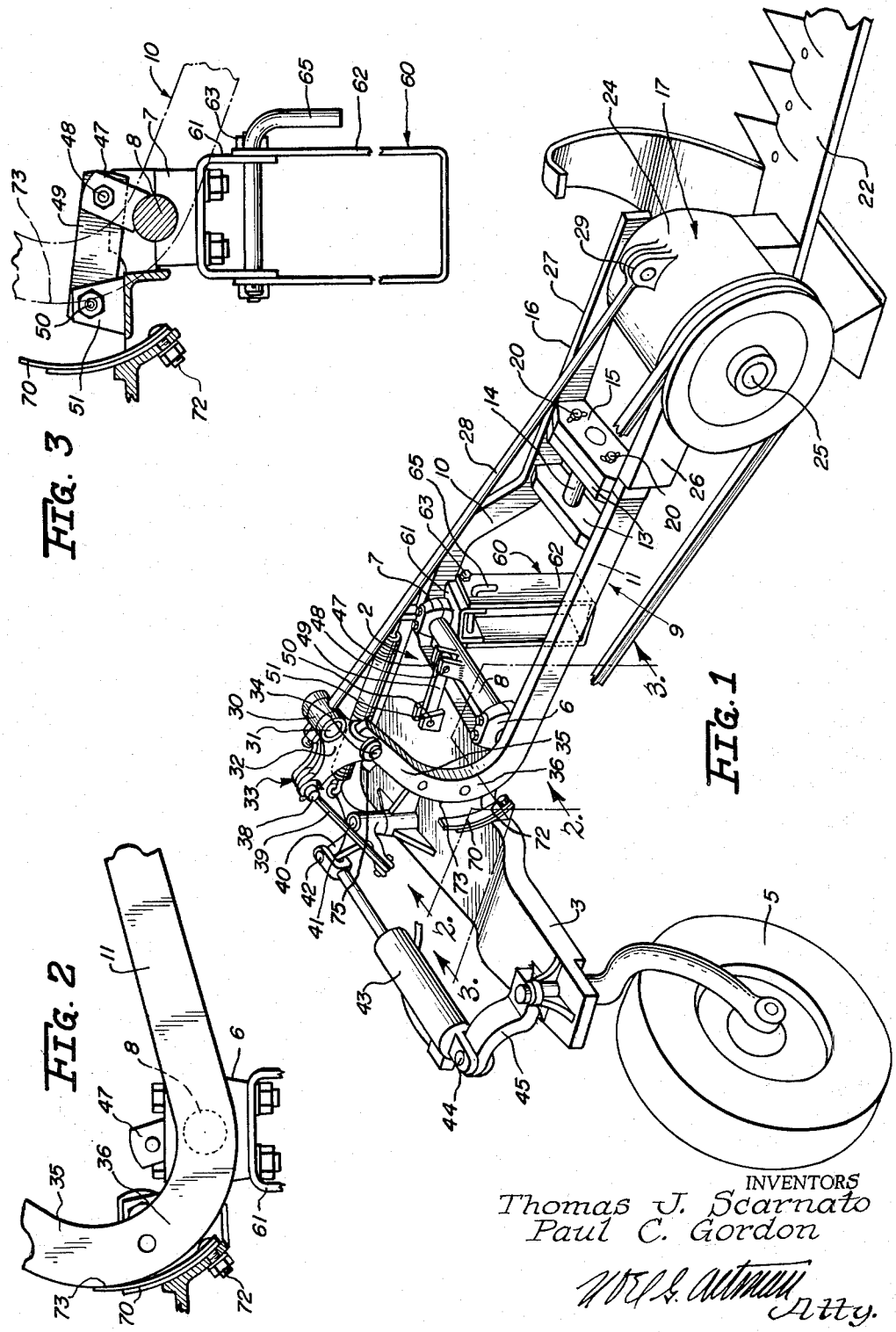

3,175,345
MOWER MOUNTING AND OPERATING
MECHANISM
Paul C. Gordon, Riverside, and Thomas J. Scarnato, Park Ridge, Ill., assignors to International Harvester Company, Chicago, Ill., a corporation of New Jersey
Filed Nov. 1, 1962, Ser. No. 234,643
3 Claims. (Cl. 56—25)

This invention relates to mowers and more specifically to a novel mounting and operating mechanism thereof.

In sickle-type reciprocating mowers there is a tendency under certain conditions for the mower to plug. These conditions generally involve rank growth or matted grasses or attempts to re-cut previously cut material. In operation the operator normally would have to dismount the tractor and manually remove the accumulations of wisps or bunches of grass and the like from the mower before he could proceed with further cutting. This is not only tedious, but is time consuming and, of course, if it occurs frequently there is a tendency on the part of the operator to keep the equipment running and therefore the removal becomes extremely hazardous.

A general object of the invention is to provide a novel mounting mechanism for the mower which may be operated to remove such accumulations that tend to plug the mower.

A more specific object of the invention is to provide a novel mounting and operating mechanism for the mower such that the operator is capable of elevating the mower and whipping the same with a whiplash effect to cast the plugging accumulations from the mower.

The invention encompasses the provision of a novel mounting mechanism which includes a coupling arm swingable vertically with the mower and wherein the coupling arm is caused to engage a yieldable abutment with a rebounding impact which causes the over-hanging mower structure to whip.

These and other objects and advantages of the invention will become more apparent from the specification and drawings wherein:

FIGURE 1 is a fragmentary perspective view of the novel mower structure incorporating the invention;

FIGURE 2 is an enlarged sectional view taken substantially on the line 2—2 of FIGURE 1 showing the coupling arm in an elevated position; and FIGURE 3 is a still further sectional view taken substantially on the line 3—3 of FIGURE 1.

Describing the invention in detail and having particular reference to the drawings there is shown a mower structure generally designated 2 which comprises the main frame 3 adapted for attachment to a tractor as well known to those skilled in the art and as shown in U.S. Patent No. 3,014,328. Frame 3 is supported at its rear end by a tail wheel 5 and provides a pivotal mounting by means of clamps 6 and 7 on a fore and aft generally horizontal axis for the pivot shaft 8 which is connected to the coupling framework 9.

The coupling framework 9 comprises laterally extending frame members 10 and 11 which are connected at their outer ends by means of the braces 13 which carry a pivot bar 14 which supports the transverse frame member 15 of the yoke 16 which carries the cutter mechanism generally designated 17. The member 15 is adjustably connected by means of the bolts 20 to the frame structure 13 and the yoke frame 16 is tiltable about the axis of the pivot shaft 14 to change the pitch or the inclination of the mower bar structure 22 of the cutter mechanism 17.

The mower bar mechanism and the cutter 17 are substantially as shown in U.S. Patent No. 2,824,416. The housing 24 of the mechanism 17 is pivoted on a substantially horizontal fore and aft extending axis on the shaft 25 which is journaled on the outer ends of the yoke frame members 26 and 27. The mower structure 17 is pivotal vertically upwardly and downwardly about the shaft 25 by means of the pull rod 28 which is secured to the upstanding ears 29 on the upper side of the housing 24, said pull rod extending upwardly and having a slidable connection with the journal member 30 which is pivoted as at 31 to one arm 32 of a bellcrank lever generally designated 33. The bellcrank lever 33 is pivoted at its elbow as at 34 to an upstanding extension 35 of the frame member 11 of the coupling structure, said extension 35 merging with the adjacent end of the frame member 11 in a curved juncture portion 36. The lever 33 is pivotally connected as at 38 to a link 39 which is connected to one arm of a lever 40 said lever being pivoted on a substantially vertical axis as by the bolt 41 to the frame 3. The lever 40 is actuated at its opposite end by a connection as at 42 to one end of a ram 43 the other end of the ram being connected as at 44 to an anchor 45 which is secured to or integrally formed with the frame 3. As best seen in FIGURE 1, the structure is shown in a parked condition whereat the pivot bar 8 which comprises lugs 47 is secured by pin 48 to one end of link 49, the other end of the link 49 being pivotally secured at 50 to a lug structure 51 which is formed or provided on the member 3. Thus it will be seen that pivot bar 8 and thus the frame structure 9 with which the same is integral is prevented from rotating and therefore the mower structure is held in a lowered position. A parking stand 60 is provided under the forward side of the frame, and the stand comprises an upper inverted U-shaped portion 61 which is suitably secured as by welding to the frame 3, and a lower portion 62 which is pivotal about a bolt 63 by which the lower portion 62 is secured to the upper portion 61 for swinging movement between supporting position and folded position attendant to withdrawal of the locking key 65, said key 65 passing through appropriate aligned openings in the upper and lower portions of the parking stand is well known to those skilled in the art.

In the operating position of the parts it will be realized that the framework 3 is suitably secured to the drawbar of a suitable tractive unit and then the latch 49 is disengaged by removal of the pin 48 so that the framework 9 and the attendant parts are freely vertically movable attendant to actuation of the cylinder structure 43.

The raising and lowering of the mower bar is accomplished through operation of the cylinder 43 and it will be realized that there is provided on the frame 3 directly behind and in the path of movement of the junction portion 36 of the coupling member 9 a resilient means 70 which is in the form of a leaf spring having a lower end anchored by means of a bolt 72 to the frame, said leaf spring being substantially complemental to the shape of the abutting edge 73 of the portion 36 of the coupling arm. Under normal circumstances the spring 70 is spaced from the surface 73 and the hydraulic cylinder 43 is evacuated so that the mower will follow undulating terrain as governed by the mower riding over the same. Upon apparent plugging occurring in the mower bar, the operator actuates the ram 43 thus raising the bar 22, swinging the coupling bar through link 22 and then after predetermined movement of the linkage 28 and abutment of the lever 33 with a stop 75 on the arm extension 35, the coupling frame structure 9 swings about the axis of the pivot member 8 thus advancing the surface 73 toward the bounce back means 70. This is accomplished with rapidity so that the coupling arm will strike the yieldable member 70 with sufficient force to deflect the same. The operator so manipulates the hydraulic fluid into the ram 43 so that upon the spring being loaded the operator releases the hydraulic fluid from the ram accommodating the frame structure 9 to bounce back. By bouncing the frame structure back and forth against the resilient element the operator induces a whipping action in the mower such that he casts off clogging accumulations of grass and the like from the mower bar so that he may quickly thereafter lower the mower bar and proceed with the cutting operation.

Having described a preferred form of the invention, it is realized that various other embodiments will be readily apparent to those skilled in the art within the scope of the appended claims.

What is claimed is:

1. In a mower, a support frame, a coupling structure pivoted to said frame for vertical swinging movement, an elongated reciprocating mower carried from said structure in longitudinal extension thereof, means for swinging said structure and mower, and an energy storing spring means interposed between said structure and frame for abutment by said structure as said structure is elevated for loading said energy storing means and rebounding said structure downwardly to produce a whipping effect in the mower for casting off clogging material thereon.

2. In a mower, supporting frame, a supported frame having a pivotal connection thereto on a substantially horizontal axis accommodating vertical swinging movement of the supported frame, a reciprocating sickle type mowing mechanism pivoted to the supported frame for vertical swinging movement relative thereto, means interconnecting said supported frame with said supporting frame accommodating limited vertical swinging movement of the supported frame relative to the supporting frame upwardly and downwardly to effect corresponding movements of the mower with abrupt debris-discarding stops at the ends of the swinging movement and resilient means comprising a leaf spring mounted on one frame in the path of movement of the other frame for rebounding engagement therewith.

3. In a mower, supporting frame, a supported frame having a pivotal connection thereto on a substantially horizontal axis accommodating vertical swinging movement of the supported frame, a reciprocating sickle type mowing mechanism pivoted to the supported frame for vertical swinging movement relative thereto, means interconnecting said supported frame with said supporting frame accommodating limited vertical swinging movement of the supported frame relative to the supporting frame upwardly and downwardly to effect corresponding movements of the mower with abrupt debris-discarding stops at the ends of the swinging movement, a generally vertical extension on the supported frame at the pivotal connection, and a generally vertical leaf spring connected to the supporting frame in the path of movement of the extension.

References Cited by the Examiner
UNITED STATES PATENTS

| | | | |
|---|---|---|---|
| 2,502,805 | 4/50 | Spurlin | 56—25 |
| 2,982,080 | 5/61 | Martin | 56—6 |
| 3,014,328 | 12/61 | Scarnato et al. | 56—25 |

T. GRAHAM CRAVER, *Primary Examiner.*

RUSSELL R. KINSEY, *Examiner.*